United States Patent [19]

Tanaka et al.

[11] Patent Number: 5,610,946
[45] Date of Patent: Mar. 11, 1997

[54] RADIO COMMUNICATION APPARATUS

[75] Inventors: Kiyoshi Tanaka; Ping Huang, both of Chiba, Japan

[73] Assignee: Uniden Corporation, Chiba, Japan

[21] Appl. No.: 378,337

[22] Filed: Jan. 26, 1995

[30] Foreign Application Priority Data

Nov. 22, 1994 [JP] Japan .................... 6-288368

[51] Int. Cl.$^6$ ............... H04J 9/00; H04L 27/06; H04L 27/32
[52] U.S. Cl. .................. 375/269; 375/344; 375/345; 455/103; 370/204
[58] Field of Search ............... 375/269, 270, 375/321, 344, 349, 345; 370/11, 76, 121, 122; 455/132

[56] References Cited

U.S. PATENT DOCUMENTS

| | | | |
|---|---|---|---|
| 4,186,347 | 1/1980 | Brockman et al. | 375/344 |
| 4,313,211 | 1/1982 | Leland | 455/139 |
| 4,726,069 | 2/1988 | Stevenson | 375/321 |
| 4,817,192 | 3/1989 | Phillips et al. | 375/344 |
| 4,852,086 | 7/1989 | Eastmond et al. | 370/11 |
| 4,901,333 | 2/1990 | Hodgkiss | 375/345 |
| 4,955,083 | 9/1990 | Phillips et al. | 375/270 |
| 5,278,826 | 1/1994 | Murphy et al. | 370/76 |

FOREIGN PATENT DOCUMENTS 63-42236 2/1988 Japan .
4-302229 10/1992 Japan .

OTHER PUBLICATIONS

A. B. Carlson, Communication Systems. New York: McGraw-Hill Book Company, p. 220. 1986.

L. W. Couch, II, Digital and Analog Communication System. New York: Macmillan Publishing Company, p. 274. 1993.

"Feedforward Transparent Tone–In–Band: Its Implementations and Applications", by Andrew Bateman, IEEE Transactions on Vehicular Technology, vol. 39, No. 3, Aug. 1990, pp. 235–243.

*Primary Examiner*—Stephen Chin
*Assistant Examiner*—Jeffrey W. Gluck
*Attorney, Agent, or Firm*—Lowe, Price, LeBlanc & Becker

[57] ABSTRACT

A radio communication apparatus comprises a first/second modulator for modulating a first/second signal according to a first/second frequency, a first demodulator for detecting the received first modulation signal and regenerating the carrier, a clock regenerator for regenerating a clock from the detection output from the first demodulator, an amplitude sampler for sampling the amplitude of the received first modulation signal according to the regenerated clock, a second demodulator for controlling the frequency of the received second modulation signal and executing demodulation for the signal, and a gain controller for executing gain control for the output from the second demodulator according to the output from the amplitude sampler.

16 Claims, 5 Drawing Sheets

F I G. 1
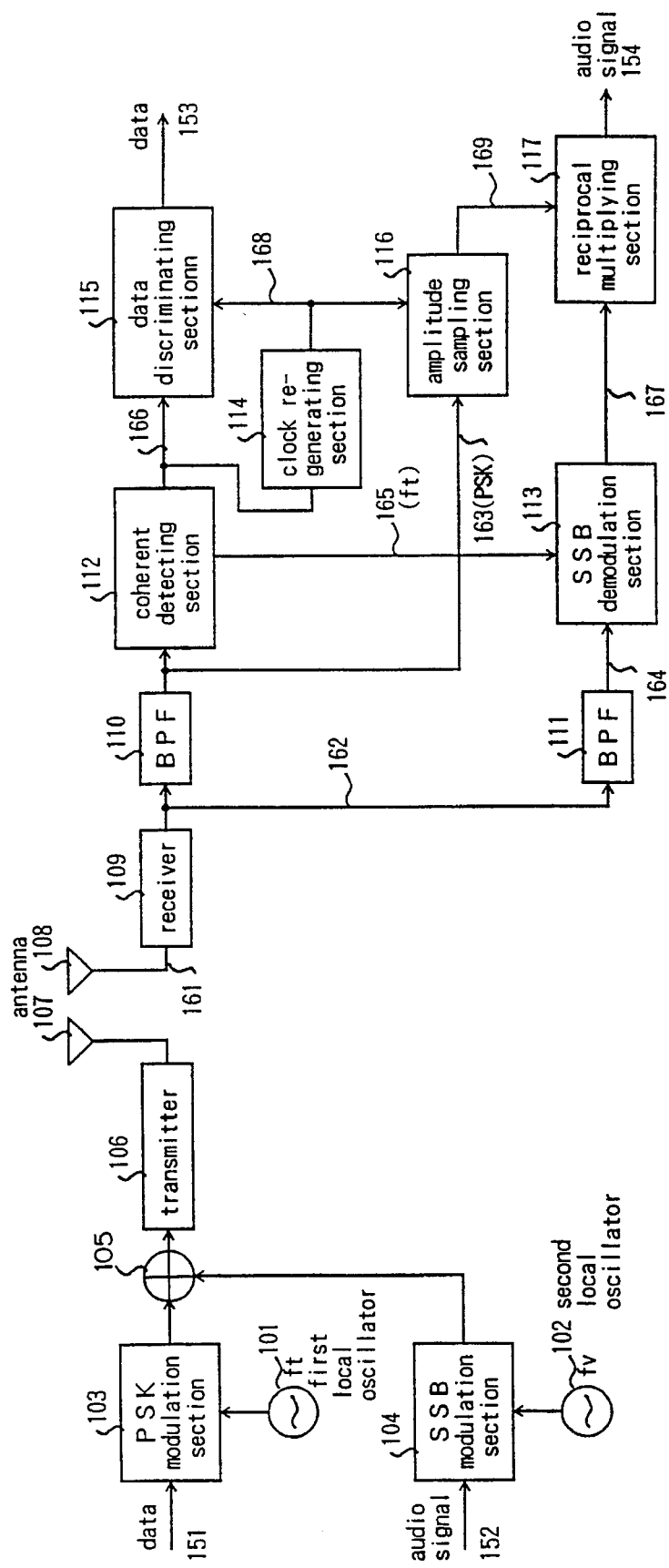

RADIO COMMUNICATION APPARATUS

FIELD OF THE INVENTION

The present invention relates to a radio communication apparatus in which the effect of fading can be corrected without inserting a pilot signal, quality of reception can be improved by broadening a band available for signal transmission, and high speed transmission through a modem can be executed.

BACKGROUND OF THE INVENTION

Generally, when transmitting signals through radio communication, sometimes so-called fading occurs in which receiving magnitude changes within a short period of time due to a fluctuation in the propagation medium through a change in propagation mode or electric wave path.

In a conventional type of radio communication apparatus, for instance, when transmitting an SSB audio signal and a data signal for controlling a system in a narrow band having a bandwidth of 5 kHz, fluctuation of amplitude due to frequency coherence as well as fading due to mobile communication is corrected by inserting a pilot signal.

In the conventional type of radio communication as described above, however, an additional bandwidth for protecting the pilot signal is required, and when transmitting an SSB audio signal and a system control data signal in a narrow band, the bandwidth for an audio signal is limited, which makes it impossible to improve quality of voice as well as to execute high speed transmission.

SUMMARY OF THE INVENTION

It is an object of the present invention to provide a radio communication apparatus in which the effect of fading can be corrected without inserting a pilot signal, quality of reception can be improved by broadening the band available for transmission of signals, and high speed transmission through a modem can be executed.

In a radio communication apparatus according to the present invention, in the transmitting device, a first modulation signal is outputted from a transmitter by modulating a first signal with a first modulator according to a first frequency, a second modulation signal is outputted by modulating a second signal with a second modulator according to a second frequency, and the first modulation and the second modulation signal are transmitted by a transmitter.

On the other hand, in the receiving device, the first modulation signal and second modulation signal are received by a receiver, the received first modulation signal is detected by a first demodulator to regenerate a carrier, a clock is regenerated from the output detected from the first demodulator by a clock regenerator, the amplitude of the received first modulation signal is sampled by an amplitude sampler at the timing of the regenerated clock, the received second modulation signal is demodulated with the frequency controlled according to the carrier regenerated by the first demodulator, and gain control for the output from the second demodulator is executed according to the output from the amplitude sampler.

With this configuration, it is possible to provide a radio communication apparatus in which the effect of fading can be compensated without inserting a pilot signal, the quality of reception can be improved by broadening the bandwidth available for transmission of signals, and high speed transmission can be executed through a modem.

In a radio communication apparatus according to the present invention, phase shift keying modulation is performed by the first modulator with amplitude modulation performed by the second modulator, and detection of coherence or differential coherence is carried out in the first demodulator.

With this configuration, it is possible to provide a radio communication apparatus in which the effect of fading can be compensated without inserting a pilot signal, the quality of reception can be improved by broadening the bandwidth available for transmission of signals, and high speed transmission can be executed through a modem.

In a radio communication apparatus according to the present invention, regeneration of a carrier in the first demodulator is executed according to the multiplication method or the Costas method.

In a radio communication apparatus according to the present invention, a first frequency component from the first demodulator is removed by a first eliminator, a second frequency component of a second modulation signal is received as a regenerated carrier by a second eliminator, and a frequency component due to fading is removed by combining outputs from the first eliminator and second eliminator with a third eliminator. With this configuration, automatic frequency control can be realized.

In a radio communication apparatus according to the present invention, in the gain controller, a reciprocal of the output from an amplitude sampler is computed by a reciprocal computing device, a sampling rate of output from the reciprocal computing device is adjusted to that of the output from the second demodulator by an adjusting unit, the output from the second demodulator is delayed by a delay circuit according to a specified period of time, and the output from the adjusting unit is multiplied by that from the delay circuit by a mixer, thus outputting a signal. With this configuration, automatic gain control is performed.

Other objects and features of this invention will become understood from the following description with reference to the accompanying drawings.

BRIEF DESCRIPTION OF THE DRAWINGS

FIG. 1 is a block diagram of a radio communication apparatus according to an embodiment of the present invention;

DETAILED DESCRIPTION OF THE EMBODIMENTS

Figure 2:
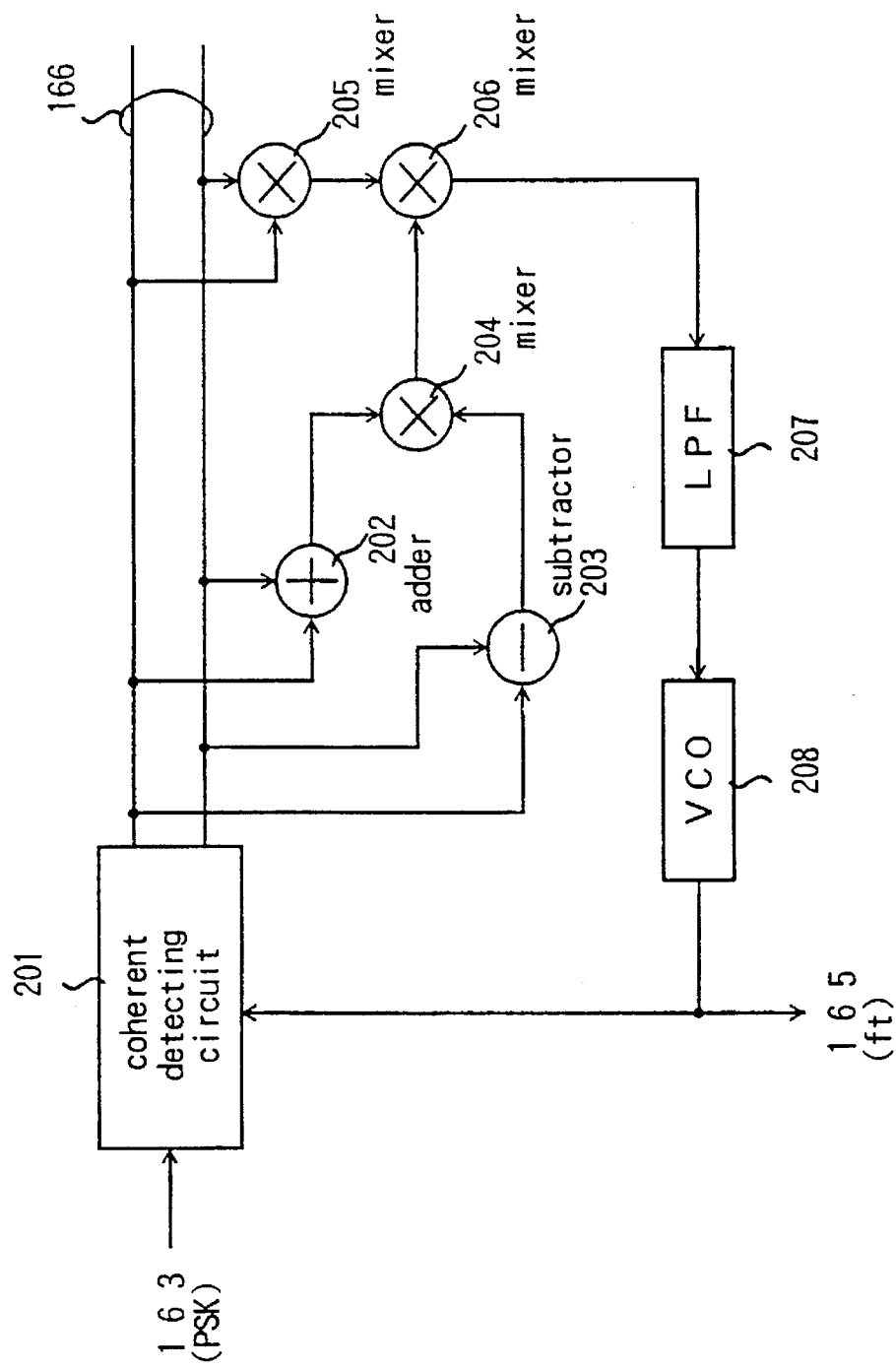
FIG. 2 is a block diagram of a case where a coherent detecting section based on the Costas method is arranged in the embodiment above.

Detailed description is made hereinafter for an embodiment of a radio communication apparatus according to the present invention with reference to the related drawings.

FIG. 1 is a block diagram of a radio communication apparatus according to an embodiment of the present invention. In the radio communication apparatus according to the present embodiment, phase shift keying (PSK) modulation is executed in a first modulator, single-sideband amplitude modulation (SSB-AM) is executed in a second modulator, and coherent detection is executed in the first demodulator.

In FIG. 1, the radio communication apparatus according to the present invention comprises a transmitting device and a receiving device. The transmitting device comprises a first local oscillator 101, a second local oscillator 102, a phase shift keying (PSK) modulation section 103, an SSB modulation section 104, an adder 105, a transmitter 106, and an antenna 107.

The receiving device comprises an antenna 108, a receiver 109, a first band-pass filter (BPF) 110, a second band-pass filter (BPF) 111, a coherent detecting section 112, a clock regenerating section 114, a data discriminating section 115, an amplitude sampling section 116, an SSB demodulation section 113, and a reciprocal multiplying section 117.

In the phase shift keying section 103, data 151 is modulated according to a first frequency (ft) from the first local oscillator 101, and a PSK modulation signal is outputted. In the SSB modulation section 104, an audio signal 152 is modulated according to a second frequency (fv) from the second local oscillator 102, and an SSB amplitude modulation signal is outputted. The PSK modulation signal and SSB amplitude modulation signal are added in the adder 105, and the resultant signal is transmitted through the transmitter 106 and the antenna 107.

The resultant signal, consisting of the PSK modulation signal and SSB amplitude modulation signal, is transmitted from a transmitting device and received by the antenna 108 as well as the receiver 109 in the receiving device. The PSK modulation signal is supplied from the first band-pass filter 110 to the coherent detecting section 112 and the amplitude sampling section 116, while the SSB amplitude modulation signal is supplied from the second band-pass filter 111 to the SSB demodulation section 113.

In the coherent detecting section 112, a carrier is regenerated by detecting the received PSK modulation signal. In the present embodiment, coherent detection is executed in the first demodulator, but differential coherent detection may be executed therein. Synchronous detection is a method of multiplying received signals for detection of a carrier, and requires an automatic phase control circuit for phase control of frequency for demodulation. On the other hand, differential coherent detection is a method of multiplying a received signal by a signal obtained by delaying the received signal by one time slot for detection of a carrier. Comparison of the former to the latter shows that coherent detection is superior in terms of noise sensitivity than differential coherent detecting, but that differential coherent detection is more resistant to delay jitter.

Regeneration of a carrier in the coherent detection 112 is carried out by using the known multiplication method or Costas method. FIG. 2 is a block diagram of a concrete configuration of the coherent detecting section 112 based on the Costas method, and the Costas loop configuration assumes a 4-phase PSK modulation.

In this figure, the coherent detecting section 112 comprises a coherent detecting circuit 201, an adder 202, a subtracter 203, mixers 204, 205 and 206, a low-pass filter (LPF) 207, and a voltage control oscillator (VCO) 208, and outputs a regenerated carrier 165 and a 2-phase detection output 166.

The SSB demodulation section 113 controls the frequency of the received SSB amplitude modulation signal 164 and performs demodulation according to a regenerated carrier 165 from the coherent detecting section 112. Herein demodulation is generally done by means of coherent detection, and a received signal is multiplied by a cosine wave having the same frequency and phase as the SSB amplitude carrier and a sinusoidal wave displaced in phase therefrom by $\pi/2$, and the base band component is allowed to pass by a low-pass filter.

Figure 3:
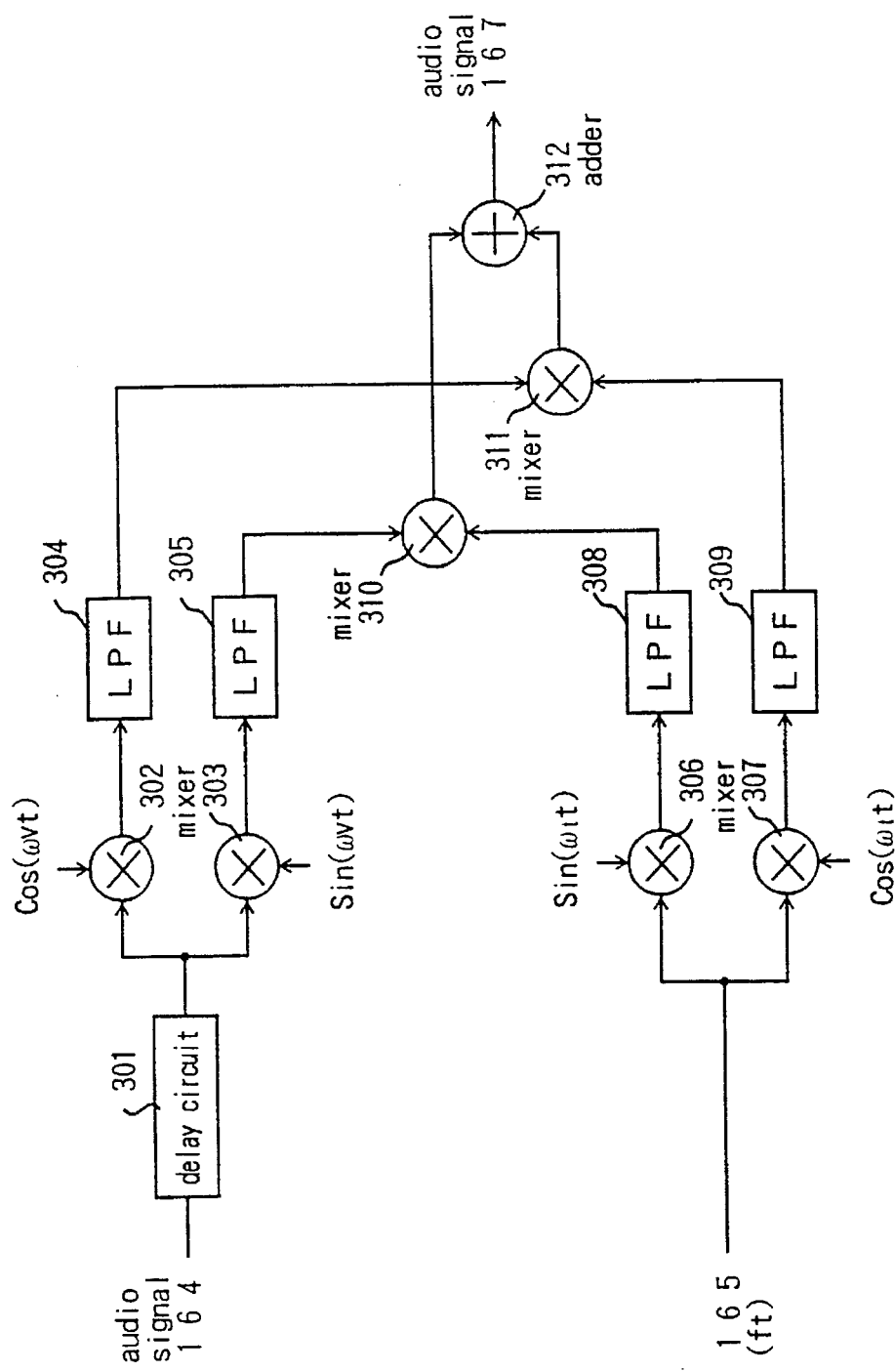
FIG. 3 is a block diagram of an SSB demodulation section in the embodiment above.

FIG. 3 is a block diagram of a specific configuration of the SSB demodulation section 113. In this figure, the SSB demodulation section 113 comprises a delay circuit 301, mixers 302, 303, low-pass filters (LPF) 304, 305, mixers 306, 307, low-pass filters (LPF) 308, 309, mixers 310, 311, and an adder 312.

In the SSB demodulation section 113, a received SSB amplitude modulation signal 164 is delayed by a specified period of time by a delay circuit 301. The delayed amplitude modulation signal is multiplied by a cosine wave each having the same angular frequency ($\omega v$) and the same phase as those of the SSB amplitude modulation carrier and a sinusoidal wave shifted in phase therefrom by $\pi/2$ in the mixers 302 and 303 respectively. The base band components are allowed to pass by the low-pass filters 304 and 305.

Herein, a signal having the same angular frequency ($\omega v$) as that of the SSB amplitude modulation carrier is, for instance, a cosine wave element and a sinusoidal wave shifted by $\pi/2$ phase. A difference between the angular frequency ($\omega t$) of the PSK modulation carrier and the angular frequency ($\omega v$) of the SSB amplitude modulation carrier ($\omega t - \omega v = \omega A$) is specific to each device, and for this reason, a cosine wave component having the same angular frequency ($\omega v$) as that of the SSB amplitude modulation carrier can be obtained by multiplying a sinusoidal wave having the same angular frequency ($\omega t$) as that of the PSK modulation carrier by a cosine wave having a frequency equivalent to the difference above, and furthermore, a sinusoidal wave can be obtained by shifting the cosine wave in phase by $\pi/2$. On the other hand, the regenerated carrier 165 is multiplied by a cosine wave and a sinusoidal wave each having the same angular frequency ($\omega t$) and the same phase as those of the PSK modulation carrier in the mixers 306 and 307 respectively, and the base band components are allowed to pass by the low-pass filters 308 and 309. Herein, a cosine wave having the same angular frequency ($\omega t$) as that of the PSK modulation carrier is the regenerated carrier 165 itself, and in this case, the sinusoidal wave having the same angular frequency as that of the PSK modulation carrier ($\omega t$) is shifted by $\pi/2$ phase from the cosine wave (by a phase shifter not shown herein). The base band components allowed to pass as described above are multiplied by each other by using mixers 310 and 311, and furthermore outputs from the mixers 310 and 311 are added, and the sum is outputted as an audio signal 167.

Namely, assuming that the original audio signal 152 $s(t)=\cos(\omega s\, t)$, the audio signal 164, when fading is included as a component of angular frequency $\omega n$, is as follows;

$$s_1(t)=\cos(\omega s\, t + \omega v\, t + \omega n\, t)$$

where $\omega v$ is the angular frequency of the second local oscillator and $\omega n$ is the error angular frequency caused by fading. It should be noted that the above expression indicates a DSB signal. However, in this embodiment, an SSB signal is generated by passing only the other side of the DSB signal through the second band pass filter 111, and in a conclusion of the following description both types of signals are substantially equivalent so that the following description is made assuming the DSB signal expressed by the above expression for convenience in description. Also, assuming that outputs from the low-pass filters 304 and 305 are A1 and B1 respectively, the respective angular frequency ($\omega v$) component is removed, and the following equations are obtained:

$$A1=\cos(\omega s\ t+\omega n\ t)$$

$$B1=\sin(\omega s\ t+\omega n\ t)$$

The regenerated carrier 165, when the fading described above is present, is obtained through the following expression.

$$x_1(t)=\cos(\omega t\ t+\omega n\ t)$$

Also assuming that outputs from the low-pass filters 308 and 309 are A2 and B2, respectively, the respective angular frequency ($\omega t$) is removed, and the following expressions are provided;

$$A2=\cos(\omega n\ t)$$

$$B2=\sin(\omega n\ t)$$

For this reason, the audio signal 167 is as shown by the following expression.

$$\begin{aligned}S_2(t)&=\cos(\omega st+\omega nt)\cdot\cos(\omega nt)+\\&\quad\sin(\omega st+\omega nt)\cdot\sin(\omega nt)\\&=\cos(\omega st)\end{aligned}$$

Namely, displacement of a frequency (component of angular frequency $\omega n$) due to fading is eliminated, which means that automatic frequency control (AFC) for the audio signal 164 has been performed.

In the clock regenerating section 114, a clock 168 is regenerated from the output 166 detected by the coherent detecting section 112. Furthermore in the data discriminating section 115, data 153 is discriminated from the detection output 166 from the coherent detecting section 112 according to the regenerated clock 168. It should be noted that, as the components are well known, description thereof is omitted herein.

In the amplitude sampling section 116, the amplitude of the received PSK modulation signal 163 is sampled at the timing of the regenerated clock 168. Furthermore in the reciprocal multiplying section 117, gain control for the audio signal 167 outputted from the SSB demodulation section 113 is performed according to the output 169 from the amplitude sampling section 116.

Figure 4:
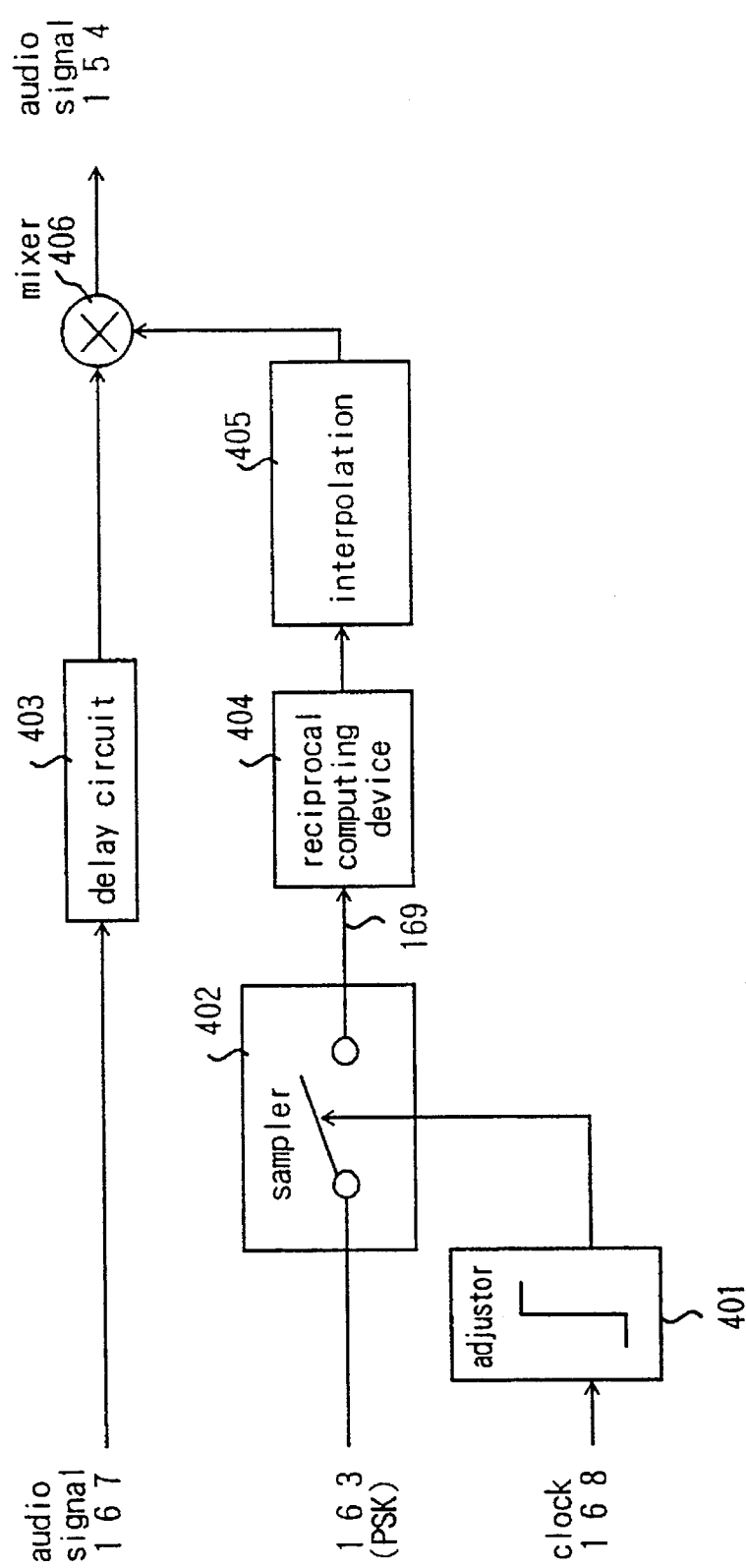
FIG. 4 is a block diagram of an amplitude sampling section and a reciprocal multiplying section in the present embodiment.

FIG. 4 is a block diagram of a particular configuration of the amplitude sampling section 116 and the reciprocal multiplying section 117 in the present invention. In this figure, the amplitude sampling section 116 comprises a clock adjustor 401 and a sampler 402, while the reciprocal multiplying section 117 comprises a delay circuit 403, a reciprocal computing device 404, an interpolation 405, and a mixer 406. It should be noted that the reciprocal computing device 404 is a computing device which outputs a reciprocal of the input and the interpolation 405 has a function to adjust a signal output rate of the receiprocal computing device 404 to the signal 167.

Namely, in the reciprocal multiplier 117, the reciprocal is computed by the reciprocal computing device 404 by referring to the amplitude (output 169) sampled in the amplitude sampling section 116. A signal obtained by interpolating the reciprocal with the interpolation 405 is multiplied in the mixer 406 by an audio signal (detection output from the SSB demodulation section 113) 167 delayed by a specified period of time by the delay circuit 403, the thus generated signal 154 being outputted. With this operation, it can be assumed that amplitude control, namely automatic gain control (AGC) for the audio signal, has been performed.

Next a description is given for the bandwidth of, and the effectiveness of transmission power in, the radio communication apparatus according to the present invention.

Figure 5A:
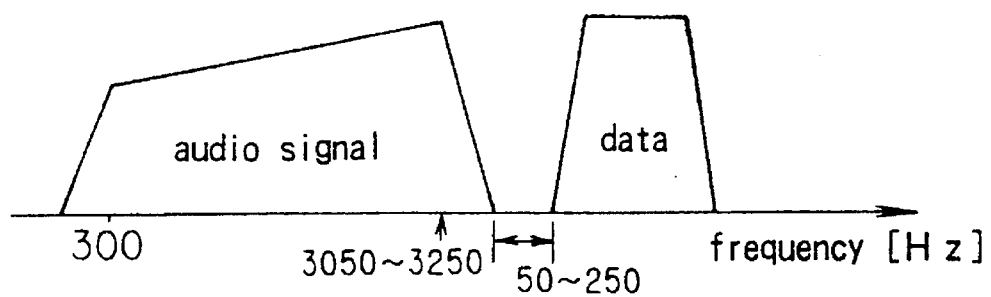
FIG. 5A is a drawing showing the spectrum characteristics of an audio signal and a data signal in the embodiment.
Figure 5B:
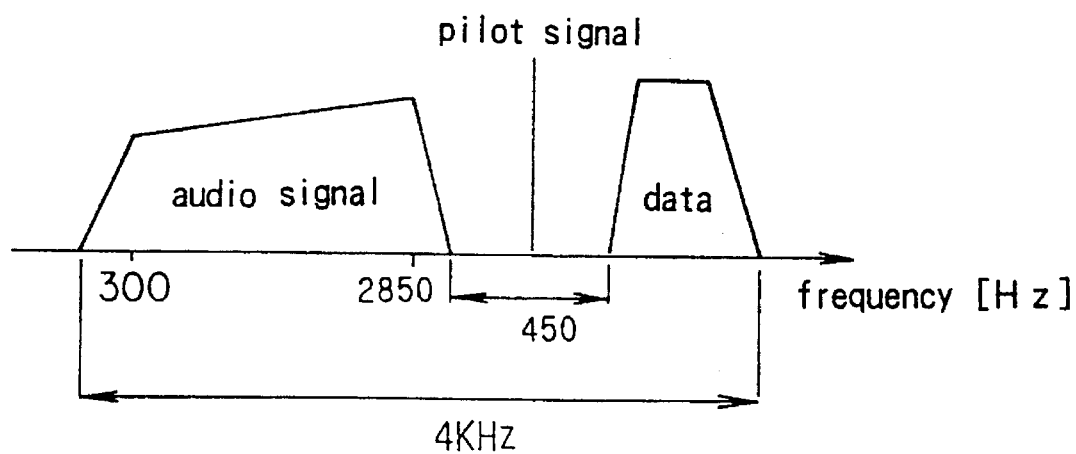
FIG. 5B is a view of the spectrum characteristics of an audio signal, a data signal, and a pilot signal in the conventional technology.

First, a description is given for the bandwidth with reference to FIG. 5. In the conventional type of radio communication device, as shown in FIG. 5B, a pilot signal is inserted between an audio signal and a data signal for transmission. In this case, the bandwidth of a pilot signal itself is narrow, but as fine filter characteristics can not be generated when extracting output a pilot signal with a filter, a space of around 450 Hz is provided so that the pilot signal will not be affected by the audio signal and data signal. Also, if there is a restriction that the entire bandwidth is not more than 4 kHz, the bandwidth actually available for transmission of an audio signal is limited to the range of from 300 to 2850 Hz.

In contrast, in the radio communication apparatus according to the present invention, as shown in FIG. 5A, it is necessary to provide a small space between the audio signal and data signal, but as compared to the conventional technology, the bandwidth can be reduced by at least 200 Hz, or by up to around 400 Hz. A bandwidth available for transmission of an audio signal can be broadened according to the reduction of space described above, which makes it possible to improve quality of voice transmitted as well as to execute high speed transmission through a modem.

Next, a description is given for transmission power. Power of a pilot signal is lower by −10 dB as compared to peak power of an audio signal, so that reduction of transmission power is 10% or less as compared to that for peak power. However, it is generally said that the average power of an audio signal is lower than peak power by around −14 dB, and it can be imagined that the reduction is larger than that for the average power.

Namely;

Average power of an audio signal=Power of a pilot signal−4 dB

Power of a data signal=Power of pilot signal+3 dB

Herein, assuming that power of a pilot signal is Pp;

Average transmission power in the conventional technology=Pp×0.4+Pp+Pp×2=3.4 Pp

Average transmission power in the present embodiment= Pp×0.4+Pp×2=2.4 Pp

Thus, transmission power in the present invention/average transmission power in the conventional technology=2.4/3.4=0.7, which means reduction of average power by around 30%.

As described above, in a transmitting device of a radio communication apparatus according to the present invention, a first modulator modulates a first signal according to a first frequency and outputs a first modulation signal, a second modulator modulates a second signal according to a second frequency and outputs a second modulation signal, and a transmitter transmits the first modulation signal and the second modulation signal.

On the other hand, in a receiving device, a receiver receives the first modulation signal and the second modulation signal, a first demodulator detects the received first modulation signal to regenerate the carrier, a clock regenerator regenerates a clock from a detection output from the first demodulator, an amplitude sampler samples the received first modulation signal at the timing of the regenerated clock, the second demodulator performs frequency control for the received second modulation signal depending on the regenerated carrier regenerated by the first demodulator and performs demodulation for the signal, and a gain controller controls the gain of the second demodulator according to output from the amplitude sampling unit. Hence, it is possible to provide a radio communication apparatus in which the quality of a received signal can be improved by broadening the bandwidth available for transmission of signals, and high speed transmission through a modem can be carried out.

In a radio communication apparatus according to the present invention, the first modulator executes phase shift keying modulation, the second modulator executes amplitude modulation, and the first demodulator executes coherent detection or differential coherent detection. Thus, it is possible to realize a radio communication apparatus in which the effect of fading can be corrected without inserting a pilot signal, the quality of reception can be improved by broadening the bandwidth available for transmission of signals, and high speed transmission through a modem can be performed.

In a radio communication apparatus according to the present invention, regeneration of a carrier in the first demodulator is performed according to the multiplication method or the Costas method, so that it is possible to realize a radio communication apparatus in which the effect of fading can be compensated without inserting a pilot signal, the quality of a receiving signal can be improved by broadening the bandwidth available for transmission of signals, and high speed transmission through a modem can be executed.

In the second demodulator of a radio communication apparatus according to the present invention, a first eliminator eliminates a first frequency component of the output from the first demodulator, a second eliminator eliminates a second frequency component of the second modulation signal received as a regenerated carrier, and a third eliminator combines the output from the first eliminator with that from the second eliminator to eliminate a frequency component due to fading, so that automatic frequency control can be realized.

In the gain controller of a radio communication apparatus according to the present invention, a reciprocal computing device computes the reciprocal of the output from the amplitude sampler, an adjusting unit adjusts the sampling rate for the output from the reciprocal computing device to that of the output from the second demodulator, a delay circuit delays the output from the second demodulator by a specified period of time, and furthermore the output from the adjusting unit is multiplied by the output from the delay circuit in a mixer to provide a signal output, so that automatic gain control can be realized.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching set forth herein.

What is claimed is:

1. A radio communication apparatus having a transmitting device and a receiving device, said transmitting device comprising:

a first modulator for modulating a first signal according to a first frequency and outputting a first digital modulation signal;

a second modulator for modulating a second signal according to a second frequency and outputting a second modulation signal; and a transmitter for transmitting said first modulation signal and said second modulation signal, said receiving device comprising:

a receiver for receiving said first modulation signal and said second modulation signal;

a first demodulator for detecting said received first digital modulation signal;

a clock regenerator for regenerating a clock from a detection output from said first demodulator;

an amplitude sampler for sampling the amplitude of said received first digital modulation signal at a timing of said regenerated clock;

a second demodulator for controlling a frequency of said received second modulation signal and performing demodulation; and a gain controller for executing gain control of said second demodulator according to output from said amplitude sampler.

2. A radio communication apparatus according to claim 1, wherein said first demodulator regenerates a carrier by multiplication or a Costas method and said second demodulator performs demodulation according to said regenerated carrier regenerated by said first demodulator.

3. A radio communication apparatus according to claim 1, wherein said first modulator performs phase shift keying modulation, said second modulator performs amplitude modulation, and said first demodulator performs coherent detection or differential coherent detection.

4. A radio communication apparatus according to claim 3, wherein said first demodulator regenerates a carrier by multiplication method or a Costas method and said second demodulator performs demodulation according to said regenerated carrier regenerated by said first demodulator.

5. A radio communication apparatus according to claim 1, wherein said second demodulator comprises a first eliminator for eliminating a first frequency component from the output from said first demodulator, a second eliminator for eliminating a second frequency component of said received second modulation signal, and a third eliminator for eliminating a frequency component due to fading by combining the output from said eliminator with that from said second eliminator.

6. A radio communication apparatus according to claim 1, wherein said gain controller comprises a reciprocal computing unit for outputting a reciprocal of the output from said amplitude sampler, an interpolation unit for adjusting the timing of the output from said reciprocal computing device to that of the output from said second demodulator, a delay circuit for delaying the output from said second demodulator by a specified period of time, and a mixer for multiplying the output from said adjusting unit by that from said delay circuit.

7. In a radio communication system having a transmitter for transmitting a first frequency signal modulated according to a first information signal and a second frequency signal modulated according to a second information signal, a receiver, comprising:

a first demodulator responsive to said first frequency signal for regenerating a carrier signal and outputting a detection output.

a first discriminator responsive to the detection output of said first demodulator for detecting said first information signal, a clock regenerator responsive to the detection output of said first demodulator for detecting a clock signal, a second demodulator responsive to said second frequency signal and said carrier signal for generating an intermediate signal representing said second information signal, and a second discriminator responsive to said first frequency signal, said intermediate signal and said clock signal for detecting said second information signal.

8. The receiver of claim 7, wherein said first information signal represents a data signal and said second information signal represents a voice signal.

9. The receiver of claim 7, wherein said second discriminator comprises an amplitude sampler responsive to said first frequency signal and said clock signal for generating samples of said first frequency signal at the frequency of said clock signal.

10. The receiver of claim 9, wherein said second discriminator further comprises an interpolation circuit responsive to said samples.

11. The receiver of claim 7, wherein said first frequency signal comprises a phase-shift keying (PSK) modulated signal.

12. The receiver of claim 7, wherein said second frequency signal comprises a single-sideband modulated signal.

13. The receiver of claim 7, wherein said receiver receives a modulated carrier comprising a combination of said first frequency signal and said second frequency signal.

14. The receiver of claim 13, wherein said receiver further comprises a frequency filtering circuit responsive to said modulated carrier for detecting said first frequency signal and said second frequency signal.

15. Method of radio communication using a combination of a first frequency signal modulated according to a first information signal and a second frequency signal modulated according to a second information signal, comprising the steps of:

receiving said combination to detect said first frequency signal and said second frequency signal, demodulating said received first frequency signal to extract a carrier and to detect said first information signal, processing said received second frequency signal, together with said carrier, to generate an intermediate signal representing said second information signal, and processing said received first frequency signal, together with said intermediate signal, to detect said second information signal.

16. A method as recited in claim 15, wherein said method uses a transmitter to transmit said combination.

* * * * *